May 31, 1966   H. A. HUCKINS, JR., ETAL   3,254,024
PROCESS FOR SEPARATING C₈ AROMATIC HYDROCARBONS
BY SERIES COLUMN DISTILLATION
Filed March 3, 1965

INVENTORS
HAROLD A. HUCKINS JR.
MONROE MALOW
ROBERT V. MARESCA

BY *William C. Long*
ATTORNEY

United States Patent Office 3,254,024
Patented May 31, 1966

3,254,024
PROCESS FOR SEPARATING C₈ AROMATIC HYDROCARBONS BY SERIES COLUMN DISTILLATION
Harold A. Huckins, Jr., New Canaan, Conn., and Monroe Malow, Westbury, Long Island, and Robert V. Maresca, North Merrick, N.Y., assignors to Halcon International, Inc., a corporation of Delaware
Filed Mar. 3, 1965, Ser. No. 438,179
2 Claims. (Cl. 208—354)

This application is a continuation-in-part of copending U.S. patent application Serial No. 118,473, filed June 20, 1961.

This invention relates to an improved process for separating hydrocarbon mixtures containing predominantly $C_8$ aromatics. More particularly, this invention relates to the separation of xylene isomers from one another and, additionally, from ethyl benzene.

Xylene, particularly ortho-xylene and para-xylene, have become of great importance in recent years and particularly for the manufacture of plastics. In conventional commercial processes, a mixed $C_8$ fraction, namely, one containing the three xylene isomers and ethyl benzene, is cooled and a large portion of the para-xylene separated as crystals. The filtrate is thereafter subject to an isomerization which restores the mixture to an essentially equilibrium concentration. Thereafter, the isomerization reaction product is treated to separate ethyl benzene, ortho-xylene, light ends and heavy ends. Additionally, a mixed xylene fraction is obtained, which is generally recycled to the crystallization step. Feed may be added at various points in the cyclic operation.

The separation of the isomerization reaction product into the aforesaid fraction requires exacting fractionation in order to sharply separate these close boiling fractions and large amounts of heating and cooling for the multiple stages of distillation and condensation.

In accordance with this invention, applicant has discovered that the aforesaid separation may be performed efficiently and with the minimization of the heating and cooling requirements by performing the distillation in an appropriate sequence and under conditions whereby the heat of the distillate from one of the distillation columns may be used to supply reboiler heat in the associated distillation columns.

More specifically, the distillation is performed in a series of columns: in the first column, ethyl benzene is separated as a distillate and a bottoms fraction which is passed to a second column; in the second column, a distillate containing mixed xylene and light ends is separated from a bottoms containing ortho-xylene and heavy ends; in the third column, the distillate from the second column is separated into light ends and a mixed xylene fraction which may be recycled to the process; and a fourth distillation wherein the bottoms fraction from the second distillation is separated into an ortho-xylene product and heavy ends.

In addition to using this sequence of separation, it is an essential feature of the instant invention to perform the second distillation at a pressure between 30 to 130 p.s.i.g., desirably 60 to 100 p.s.i.g. and preferably 75 to 85 p.s.i.g. By operating at these elevated pressures, the condensation temperature of the distillate from the second column is sufficiently high to supply reboiler heat to one or more of the associated distillation columns. This temperature is at least 200° C., preferably from 218° C. to 224° C. Additionally, the first, third, and fourth distillations must be conducted under carefully controlled pressures and temperatures so as to effect the sharpest separation of components. These conditions are shown in the following table:

TABLE I

|  | Top Column Pressure, p.s.i.g. | | Bottom Column Temperature, ° C. | |
|---|---|---|---|---|
|  | Broadly | Preferably | Broadly | Preferably |
| First Column, 2 | 0 to 30 | 3 to 8 | 185 to 220 | 200 to 210. |
| Third Column, 9 | 0 to 30 | 3 to 15 | 150 to 190 | 155 to 175. |
| Fourth Column, 13 | 0 to 30 | 3 to 10 | 168 to 225 | 174 to 185. |

The accompanying drawing illustrates diagrammatically an embodiment of the invention.

Referring to the drawing, a $C_8$ aromatic fraction substantially free of materials boiling the same as or lower than ethylbenzene is introduced by means of line 1 into fractionator 2 wherein the mixture is separated into a substantially pure ethylbenzene overhead product and a bottoms comprised of other $C_8$ aromatics and some ethylbenzene. The fractionator 2 is illustratively one or more multi-tray distillation columns such as are known for this type operation. Heat which is needed to accomplish the distillation separation is provided at the base of fractionator 2 by means of reboiler 3 as will be more fully described hereinafter.

The ethylbenzene is recovered by means of line 4. The bottoms stream from fractionator 2 is passed by lines 5 and 6 to fractionator 7 wherein the mixture is fractionally distilled under conditions of elevated pressure to produce a bottoms fraction comprise of orthoxylene and higher boiling materials and an overhead vapor fraction comprising metaxylene, paraxylene, orthoxylene, and small amounts of ethylbenzene and lower boiling materials. The bottoms stream from the fractionator 2 is desirably admixed with a recycle stream comprised of $C_8$ aromatics from an isomerization step as later described prior to fractionation in fractionator 7.

The heat necessary to accomplish the separation by distillation in fractionator 7 is provided from an external heat source illustrated by reboiler 18. Preferably liquid from the lower section of the fractionator is vaporized outside the fractionator by indirect heat exchange as in an indirect fired heater and the resulting vapors are fed back to the lower part of the fractionator. Alternatively, other means of providing the heat to fractionator 7 can be employed.

In fractionator 7, the charge mixture is separated into a liquid bottoms stream of orthoxylene and materials boiling higher than $C_8$ aromatics. The bottoms stream from fractionator 7 is passed through line 8 to fractionator 9 wherein orthoxylene is separated overhead by means of line 10 in high purity from the higher boiling materials which are removed through line 11. Heat needed to accomplish this separation is provided by means of reboiler 12.

The overhead vapors from fractionator 7 are employed in accordance with this invention to impart reboil heat to fractionator 2, to fractionator 9 and to fractionator 13 which last is employed to separate a fraction mainly containing metaxylene, orthoxylene and paraxylene together with a small amount of ethylbenzene through line 14 from overhead lower boiling material which is removed through line 15. By the novel distillation arrangement, outstanding process economies are achieved as contrasted with prior processes.

In prior processes, each of the various fractionator was equipped with separate and independent heating and cooling means. Normally, heat was provided by steam or an equivalent external source to the base reboiler of each column in order to accomplish the distillation separation. The overhead vapors from each column were cooled and condensed in separate and independent apparatus by indirect heat exchange with cooling water.

In such prior processes, the equipment costs were very high. Additionally, of the large quantities of heat necessary to accomplish the separation by distillation of the close boiling $C_8$ materials, most of the heat was lost in the cooling water.

The present invention represents a marked and significant advance over such prior techniques. In the present inventive process, the heat necessary to accomplish the separation in fractionator 7 rather than being lost is recovered and employed to accomplish the distillation separations in fractionators 2, 13, and 9. The vapors from fractionator 7 convey and impart fractionation heat to fractionators 2, 9 and 13. Reboilers 3, 12 and 16 serve the dual purpose of supplying heat to the respective fractionators and condensing the vapors from fractionator 7. Thus the system condenser requirement is significantly less as contrasted with the prior techniques.

Further, it will be apparent from a consideration of the present process that outstanding heat economies are attained. Where previously large quantities of the heat necessary to accomplish the separation in fractionator 7 were lost as a result of the cooling and condensing of overhead vapors from column 7 with cooling water, in the present process a minimum of this heat is converted to a non-usable state. Thus outstanding heat economies are obtained.

The vapors from column 7 are condensed in reboilers 3, 12 and 16 while providing heat to columns 2, 9 and 13. The condensed liquid is passed to collecting vessel 17 by line 23, 19 and 20. From vessel 17, some liquid is returned to column 7 as reflux through line 21 and the remainder is charged to column 13 by means of line 22. In column 13 a liquid metaxylene, orthoxylene and paraxylene mixture containing a small amount of ethylbenzene is separated and recovered by means of line 14 from a lower than $C_8$ aromatic boiling fraction which is removed through line 15.

This metaxylene, orthoxylene and paraxylene fraction is desirably subjected to a crystallization treatment in accordance with known techniques (not shown) whereby substantially pure product paraxylene is recovered. The filtrate can be subjected to an isomerization treatment by known techniques and after appropriate purification steps the isomerizer effluent can be admixed with the bottoms from fractionator 2 and fed to fractionator 7 through line 6.

The invention is illustrated but not limited by the following example wherein unless otherwise speified the parts are parts by weight.

*Example 1*

About 110 parts of a $C_8$ aromatic fraction containing about 22% orthoxylene. 18% paraxylene, 40% metaxylene and 20% ethylbenzene is fractionated in fractionator 2. Substantially pure (99.9%) ethylbenzene in amount of about 20 parts is obtained as overhead vapor at about 140° C. and 3 p.s.i..g. condensed and recovered as product. A liquid bottoms stream is removed from the fractionator 2 at about 200° C. and 50 p.s.i.g. through line 5.

The bottoms stream in amount of about 90 parts and containing about 26.9% orthoxylene, 22.0% paraxylene, 48.9% metaxylene and 2.2% ethylbenzene is combined with about 205 parts of a purified isomerizer effluent to form a mixture containing about 21.4% orthoxylene, 21.3% paraxylene, 53.2% metaxylene and 4.1% of ethylbenzene and higher and lower boiling hydrocarbons. The mixture is fractionated in a multi-tray distillation column 7. Heat is provided by withdrawing liquid from the bottom of the column, vaporizing this liquid in an indirect fired heater and returning the vapors to the lower part of column 7. About 2300 parts of an overhead fraction composed of about 26.7% paraxylene, 2.5% orthoxylene, 67.4% metaxylene and 3.4% of ethylbenzene and lighter boiling impurities is removed as vapor at about 220° C. and 80 p.s.i.g. A bottoms fraction in amount of about 65 parts and containing 92% orthoxylene and 8% impurities is removed as liquid at about 235° C. and 110 p.s.i.g.

The said bottoms fraction is passed through line 8 to multi-tray distillation column 9 wherein it is distilled to separate about 60 parts of a high purity orthoxylene (96%) vapor overhead at about 150° C. and 5 p.s.i.g. from a heavier bottoms fraction. The heavier bottoms is removed at about 175° C. and 15 p.s.i.g.

The overhead vapor from fractionator 7 at about 220° C. and 80 p.s.i.g. is divided into three streams. One stream in amount of about 1950 parts is passed to reboiler 3 at the base of fractionator 2 wherein the vapor condenses and thus provides distillation heat to the fractionator 2. The second stream in amount of about 120 parts is passed to reboiler 12 at the base of fractionator 9 wherein orthoxylene is separated from higher boiling materials. In reboiler 12 the vapor condenses and provides distillation heat to fractionator 9. Likewise, in a similar manner about 230 parts of the vapor are employed in reboiler 16 of fractionator 13 to provide heat necessary for separating lighter materials from the metaxylene, orthoxylene and paraxylene fraction.

The condensate from the reboiler is collected in collection vessel 17. About 2070 parts of the condensate is recycled to fractionator 7 as reflux. About 230 parts of the condensate is fed to fractionator 13 wherein about 10 parts of light material is removed overhead at about 120° C. and 5 p.s.i.g. A bottoms fraction in amount of about 220 parts is obtained consisting of about 28.5% paraxylene, 67.7% metaxylene, 2.8% orthoxylene, 1.0% ethylbenzene and other material. This bottoms fraction is at about 160° C. and 12 p.s.i.g.

A portion of this bottoms fraction is cooled to about −70° C. thereby to crystallized paraxylene. The paraxylene is separated by centrifugation in amount of about 15 parts in 98.5% purity.

The remaining portion of said bottoms fraction is combined with the liquid filtrate after separation of the paraxylene crystals and this resulting mixture is isomerized at about 460° C. and 190 p.s.i.g. in the presence of hydrogen whereby the paraxylene and orthoxylene content thereof is enriched and the isomerizate has a composition of about 19% orthoxylene, 21% paraxylene, 53% metaxylene, 1% ethylbenzene, 4% lighter than C–8's and 2% heavier than C–8's. The isomerization can be performed in the absence of hydrogen.

After distillation to remove the light and heavy material, the isomerizate is combined with bottoms from fractionator 2 and further treated as above-described.

*Example 2*

About 110 parts of a C–8 aromatic having the same composition as described in Example 1 is distilled in fractionator 2 as described in Example 1 to separate about 20 parts of ethylbenzene overhead from the liquid bottoms stream.

The bottoms stream in amount of about 90 parts and containing about 26.9% orthoxylene, 22% paraxylene, 48.9% metaxylene, and 2.2% ethylbenzene is combined with about 295 parts of a purified isomer effluent. The resulting combined mixture is fractionated in multi-tray distillation column 7. Heat is provided by withdrawing liquid from the bottom of the column, vaporizing this liquid in an indirect fired heater, and returning the vapors to the lower part of the column 7. About 2555 parts of an overhead fraction composed of about 22.5% paraxylene, 17.8% orthoxylene, 54% metaxylene and 5.7% of ethylbenzene and lighter boiling impurities is removed as vapor at about 220° C. and 80 p.s.i.g. A bottoms fraction in amount of about 20 parts and containing about 75% orthoxylene and 25% impurities is removed as liquid at about 235° C., and 85 p.s.i.g.

The said bottoms fraction is passed through line 8 to multi-tray distillation column 9 wherein it is distilled to separate about 16 parts of a high purity orthoxylene (96%) vapor overhead at about 150° C. and 5 p.s.i.g. from a heavier bottoms fraction. The heavier bottoms is removed at about 175° C. and 15 p.s.i.g.

The overhead vapor from fractionator 7 at about 220° C. and 80 p.s.i.g. is divided into three streams. One stream in amount of about 1950 parts is passed to reboiler 3 at the base of fractionator 2 wherein the vapor condenses and thus provides distillation heat to the fractionator 2. The second stream in amount of about 125 parts is passed to reboiler 12 at the base of fractionator 9 wherein orthoxylene is separated from higher boiling materials. In reboiler 12 the vapor condenses and provides distillation heat to fractionator 9. Likewise, in a similar manner about 480 parts of the vapor are employed in reboiler 16 of fractionator 13 to provide heat necessary for separating lighter materials from the metaxylene, orthoxylene and paraxylene fraction.

The condensate from the reboiler is collected in collection vessel 17. About 2190 parts of the condensate is recycled to fractionator 7 as reflux. About 365 parts of the condensate is fed to fractionator 13 wherein 14 parts of light material is removed overhead at about 120° C. and 5 p.s.i.g. A bottoms fraction in amount of about 351 parts is obtained consisting of about 23.3% paraxylene, 56.5% metaxylene, 18.5% orthoxylene, 1.7% ethylbenzene and other material. This bottoms fraction is at a temperature of 160° C. and a pressure of 12 p.s.i.g.

The said bottoms fraction is cooled to about −70° C. thereby to crystallize paraxylene. The paraxylene is separated by centrifugation in amount of about 56 parts in 98.5% purity.

The filtrate is isomerized at about 460° C. and 190 p.s.i.g. in the presence of hydrogen whereby the paraxylene and orthoxylene content thereof is enriched and the isomerizate has a composition of about 19% orthoxylene, 21% paraxylene, 53% metaxylene, 1% ethylbenzene, 4% lighter than C-8's and 2% heavier than C-8's.

After distillation to remove the light and heavy material, the isomerizate is combined with bottoms from fractionator 2 and further treated as above described.

In view of the foregoing disclosures, variations and modifications thereof will be apparent to one skilled in the art, and it is intended to include within the invention all such variations and modifications except as do not come within the scope of the appended claims.

We claim:
1. The process of separating a $C_8$ aromatic hydrocarbon mixture containing ethyl benzene, ortho-xylene, meta-xylene, and para-xylene in a series of distillation columns having reboilers which comprises: distilling said mixture in a first distillation zone to separate an overhead ethyl benzene fraction from a bottoms fraction containing ortho-xylene, meta-xylene and para-xylene; distilling said bottoms fraction in a second distillation zone at a pressure from 30 to 130 p.s.i.g., to separate overhead a mixed xylene vapor from a bottoms ortho-xylene fraction; distilling the ortho-xylene fraction in a third distillation zone to separate product ortho-xylene from heavier materials; distilling said mixed fraction after condensation in a fourth distillation zone to separate lighter materials from the xylene; and passing said mixed xylene vapors to at least one of the reboilers of said first, third and fourth distillation columns, thereby condensing said vapor by indirect heat exchange with the mixture in said reboiler, said vapor condensing at a temperature at least as high as the temperature of said mixture in said reboiler.

2. A process according to claim 1 wherein the bottoms fraction in the second distillation zone is distilled at a pressure of from 60 to 100 p.s.i.g.

References Cited by the Examiner

UNITED STATES PATENTS

| | | | |
|---|---|---|---|
| 713,298 | 11/1902 | Goss | 202—45 X |
| 2,288,126 | 6/1942 | Dunn et al. | 202—40 X |
| 2,325,379 | 7/1943 | Durrum | 202—39.5 |
| 2,721,170 | 10/1955 | Johnson | 202—39.5 |
| 2,763,604 | 9/1956 | Dorsey et al. | 202—39.5 |
| 2,795,629 | 6/1957 | Boedeker. | |
| 3,067,270 | 12/1962 | Weedman. | |

FOREIGN PATENTS 943,890   12/1963   Great Britain.

NORMAN YUDKOFF, *Primary Examiner.*

F. E. DRUMMOND, *Assistant Examiner.*